United States Patent Office 2,986,495
Patented May 30, 1961

2,986,495
PROCESS FOR THE SIMULTANEOUS PRODUCTION OF D-ARABITOL, ERYTHRITOL AND GLYCEROL

Hiroshi Onishi, Chiba-ken, Japan, assignor to Noda Industrial and Scientific Research Laboratory, Chiba-ken, Japan, a corporation of Japan Filed Apr. 20, 1959, Ser. No. 807,420

Claims priority, application Japan Feb. 20, 1959

9 Claims. (Cl. 195—37)

This invention relates to the production of polyhydric alcohols. More particularly it relates to the simultaneous formation of glycerol, D-arabitol and erythritol by fermentation of a sugar.

After extensive studies on various genera of yeasts which can produce polyhydric alcohols, it has now been found that all these yeasts have individual characteristics in the production of polyhydric alcohols and are classified in six types as following:

Type 1: Yeasts being productive for glycerol alone.
Type 2: Yeasts being productive for D-arabitol alone.
Type 3: Yeasts being productive for erythritol alone.
Type 4: Yeasts being productive for glycerol and D-arabitol.
Type 5: Yeasts being productive for D-arabitol and erythritol.
Type 6: Yeasts being productive for glycerol, D-arabitol and erythritol.

Among these types of yeasts, only those of Type 4 involving Zygosaccharomyces genus and Saccharomyces rouxii (osmophilic Saccharomyces) are well known as producing the polyhydric alcohols other than glycerol. (Cf. Appl. Microbiol. 6, 349 (1958); Can. J. Microbiol. 2, 72 (1956); U.S.P. 2,793,981 (1957).) Now it has been discovered that the film-forming yeasts of Pichia genus or Debaryomyces genus belong to Type 6, and they can produce an exceptionally large amount of polyhydric alcohols by fermentation.

These yeasts of Pichia and Debaryomyces genera are oxidizing type in the metabolic system, whereas those of Zygosaccharomyces and Saccharomyces genera are fermenting type. Heretofore it was considered that the yeasts which may be used in the present invention are commercially useless, and in some cases e.g. brewage of soy sauce, bean paste or salted pickles, they are regarded as noxious. Accordingly, it is surprising that we have now found that simultaneous production of glycerol, D-arabitol and erythritol in good yields can be carried out by the fermentation wherein the yeasts stated above are utilized.

The strains which may be most preferably used in the present invention include Pichia miso and Debaryomyces mogii. The former strain was isolated from bean paste (miso) and named as Pichia miso (Mogi: J. Agr. Chem. Soc. Japan 15, 921, 1023, 1221 (1939); ibid. 16, 7, (1940)), and later renamed as Pichia mogii (Ohara and Nonomura: J. Agr. Chem. Soc. Japan 28, 122 (1954)) or as Pichia sake form α (Kodama: J. Fermentation Technol. 33, 455 (1955)). The later strain also was isolated from bean paste (miso) and named as Zygosaccharomyces tikumaensis. Later it was observed from experiment according to Lodder and Kreger van Rij method (1952) that the above strain has a remarkable film-forming property and a poor fermenting activity in an ordinary medium and its cells are round, and therefore this strain was renamed as Debaryomyces mogii. These strains indicated hereinabove would be isolated from bean paste which is subjected to plate culture using koji-agar or 10% NaCl-koji-agar, and then purified by single cell isolation.

According to the classification by Lodder and Kreger van Rij (1952), the mycological characteristics of the strains are set forth in Table 1.

TABLE 1

| | Pichia miso H52 | Debaryomyces mogii H71 |
|---|---|---|
| Vegetative cells (after cultivation in koji extract at 30° C. for 6 days) | Cells are oval to elongated, (2.5-5) x (3-7)μ, single, in pairs or short chains. | Cells are round to short oval, 4-6μ, single, in pairs or short chains. |
| Growth in koji agar after 2 weeks at 30° C | The streak culture is white gray colored, dry dull glistening and very wrinkled. | The streak culture is white gray colored, dry dull glistening and wrinkled. |
| Slide culture on potato agar | Primitive pseudomycelium or no pseudomycelium. | No pseudomycelium. |
| Ascospore formation | Spores are round or short oval 2 x 3μ. One to 4 spores are found per ascus. | Spores are round, 2-3μ. One to 3 spores are found per ascus. |
| Growth in koji extract: | | |
| (a) NaCl-free medium | (a) Good growth, dry wrinkled pellicle | (a) Good growth, dry wrinkled pellicle. |
| (b) 18% NaCl medium | (b) Good growth, dry wrinkled pellicle | (b) Good growth, dry wrinkled pellicle. |
| Fermentation of sugars: | | |
| (a) Fermented | (a) Glucose, galactose | (a) Glucose, galactose. |
| (b) Not fermented | (b) Maltose, saccharose, lactose | (b) Maltose, saccharose, lactose. |
| Assimilation of sugars: | | |
| (a) Assimilated | (a) Glucose, galactose, saccharose | (a) Glucose, galactose, saccharose. |
| (b) Not assimilated | (b) Maltose, lactose | (b) Maltose, lactose. |
| Assimilation of nitrate | Negative | Negative. |
| Growth in ethanol | Good growth | Good growth. |
| Splitting of arbutin | Negative, occasionally weakly positive | Negative. |

Both of the yeasts indicated in the above table are highly sugar- and salt-tolerable, and they can utilize completely a concentrated solution of 30% glucose.

The yeasts of the aforesaid genera are tested for the production of polyhydric alcohols by carrying out the following procedures. That is to say, freshly cultured strains are inoculated into 500 ml. shaking flasks containing 80 ml. of an aqueous medium having a pH of 4.8 and containing:

| | Percent |
|---|---|
| Glucose | 30 |
| $KH_2PO_4$ | 0.1 |
| $MgSO_4 \cdot 7H_2O$ | 0.05 |
| $CaCl_2 \cdot 2H_2O$ | 0.01 |
| NaCl | 0.01 |
| Casamino acid | 0.4 |
| Yeast extract | 0.1 |

These flasks are placed on a reciprocating shaker having an amplitude of 75 mm. and a rotation of 120 r.p.m., and subjected to shaking culture at 30° C. for 10 days. Then the fermentation broth from which yeast cells have been removed by filtration is analysed in accordance with Neish's method (cf. Analytical Method for Bacterial Fermentation, 2nd Rev., Natl. Research Council Can., Prairie Regional Lab., Saskatoon, Sask., N.R.C. No. 2952 (1952)). Further the fermentation broth is subjected to paper chromatography to determine qualitatively polyhydric alcohols. In other words, the polyhydric alcohols in the fermentation broth are developed using a mixed solvent (n-propanol:ethyl acetate:water=7:1:2) (cf. Anal. Chem. 27, 1400 (1955)) and then detected according to Yoda's method (cf. J. Chem. Soc. Japan 73, 18 (1952)). These analytical results are shown in the following table.

TABLE 2

| Strain | Glucose consumed, percent | Polyhydric alcohols produced (as glycerol), percent | Yields of polyhydric alcohols (as glycerol),[1] percent | Polyhydric alcohols produced | | |
|---|---|---|---|---|---|---|
| | | | | D-arabitol | Erythritol | Glycerol |
| Pichia miso H52 | 28.6 | 12.24 | 42.4 | ++++ | ++ | ++++ |
| Debaryomyces mogii H71 | 29.5 | 11.44 | 38.1 | ++++ | + | ++++ |
| P. mandshurica (Control) | 16.3 | 1.90 | 11.7 | +++ | + | ++ |

[1] Yields of polyhydric alcohols as glycerol are calculated based on the amounts of glucose consumed.

The above table shows that the yeasts of Pichia and Debaryomyces genera have good productivity of polyhydric alcohols.

With respect to the formation of glycerol, D-arabitol and erythritol and their isolation from the fermentation broth the following description will refer to a strain of *Pichia miso* which is typical strain suitable for the present invention. In Table 3, the total amount of polyhydric alcohols produced is determined by Neish's method, and pure glycerine is determined by means of partition chromatography using Celite 535. Erythritol and D-arabitol are respectively determined by subjecting the broth to paper chromatography and then eluting each of the developed spots with water.

TABLE 3

Glucose consumed _____ percent__ 29.47
Polyhydric alcohols produced (calculated as glycerol) _____ percent__ 11.5
Yield of polyhydric alcohols from glucose consumed _____ percent__ 39.0
D-arabitol produced _____ do____ 8.5
Yield of D-arabitol from glucose consumed
 percent__ 28.8
Erythritol produced _____ do____ 0.6
Yield of erythritol from glucose consumed
 percent__ 2.0
Glycerol produced _____ do____ 5.9
Yield of glycerol from glucose consumed
 percent__ 20.0
Riboflavin produced _____ µg./ml__ 2.1

The fermentation broth has yellow-brown colored fluorescence and the bioassay of said broth indicates the formation of riboflavin, the amount of which is set forth in Table 3. The method for recovering polyhydric alcohols will be clearly understood by reference to Fig. 1 of the accompanying drawings which shows a flow sheet of suitable process for the isolation of glycerol, D-arabitol and erythritol from the broth fermented according to the present invention.

The D-arabitol thus obtained is in the form of prismatic crystals melting at 102° C. and has a little sweet taste. Its empirical formula is $C_5H_{12}O_5$ and $$[\alpha]_{20}^{D} = +8.28$$

($C=9.78$, saturated borax solution). As seen from the data of infra-red spectrum (Fig. 2), the D-arabitol crystal obtained in the present invention is identical with authentic D-arabitol. The erythritol crystal obtained in the present invention is in the form of tetragonal prisms and has a melting point of 121° C. and a sweet taste. Empirical formula $C_4H_{10}O_4$. The infra-red spectrum (Fig. 3) shows that the erythritol obtained by the present invention is identical with authentic erythritol.

The following tests wherein a strain *Pichia miso* H52 is employed are carried out in order to determine various cultivation conditions for the production of polyhydric alcohols. At the same time, these tests will serve to understand the characteristics and features of the present invention more clearly.

*Glucose concentration*

As understood from the following Table 4, the glucose concentration of from 30% to 40% is most preferred to the production of polyhydric alcohols. When the glucose concentration is about 10%, the production of polyhydric alcohols is considerably low. As to the types of polyhydric alcohols, D-arabitol is well produced independently of the glucose concentration, whereas erythritol can be produced only at the glucose concentration ranging from 30% to 40% and glycerol is scarcely produced at the glucose concentration of 10%.

TABLE 4

| Glucose concentration in culture medium, percent | Glucose consumed, percent | Polyhydric alcohols produced (as glycerol), percent | Yield of polyhydric alcohols from glucose consumed (as glycerol), percent | Polyhydric alcohols produced | | |
|---|---|---|---|---|---|---|
| | | | | D-arabitol | Erythritol | Glycerol |
| 10 | 9.82 | 1.84 | 18.7 | +++ | − | ± |
| 20 | 19.19 | 6.13 | 31.9 | +++ | − | ++ |
| 30 | 27.65 | 11.91 | 43.1 | ++++ | ++ | +++ |
| 40 | 23.15 | 9.80 | 42.3 | ++++ | ++ | +++ |
| 50 | 15.52 | 5.20 | 33.5 | ++++ | ± | +++ |

*Effect of added nitrogen source*

As to the nitrogen source of culture medium, both of ammonia N and amino N are suitable for the satisfactory production of polyhydric alcohols. Now it should be noted that in a case wherein inorganic nitrogen sources are utilized, the pH of culture medium rapidly decreases to 2.0 or less than at the initial stage of the fermentation and as its result the production of polyhydric alcohols is reduced. Therefore, if an inorganic compound is used as a nitrogen source, a buffer solution (e.g. K-citrate and citric acid buffer) must be added to the culture medium to prevent the depression of a pH of said medium during the fermentation.

TABLE 5

| Nitrogen Source | Glucose consumed, percent | Polyhydric alcohols produced (as glycerol), percent | Yield of polyhydric alcohols (as glycerol), percent | Polyhydric alcohols | | |
|---|---|---|---|---|---|---|
| | | | | D-arabitol | Erythritol | Glycerol |
| Meat extract, 0.4% | 11.88 | 4.64 | 39.1 | +++ | ± | +++ |
| Corn steep liquor, 0.4% | 20.24 | 8.78 | 43.3 | +++ | ++ | ++++ |
| Polypeptone, 0.4% | 18.24 | 9.98 | 54.7 | ++++ | ++ | ++++ |
| Yeast extract, 0.4% | 28.80 | 11.19 | 38.8 | ++++ | ++ | ++++ |
| Ammonium lactate, 0.2% | 28.85 | 12.09 | 41.9 | ++++ | ++ | ++++ |
| Urea, 0.05% | 23.98 | 10.15 | 42.3 | +++ | ++ | ++++ |
| Ammonium sulfate, 0.2% Not added with buffer | 12.32 | 2.07 | 16.8 | ++ | − | ++ |
| Ammonium sulfate, 0.2% Added with buffer | 27.54 | 9.46 | 34.3 | ++++ | + | ++++ |
| Ammonium chloride, 0.2% Not added with buffer | 11.69 | 1.81 | 15.4 | + | − | ++ |
| Ammonium chloride, 0.2% Added with buffer | 23.32 | 7.79 | 33.4 | ++++ | + | ++++ |

Effect of the type of sugar

As shown in the following Table 6, polyhydric alcohols can be remarkably produced by the fermentation of glucose, fructose or mannose, but scarcely produced by that of galactose, maltose or saccharose.

TABLE 6

| Culture medium containing | Sugar consumed, percent | Polyhydric alcohols produced (as glycerol), percent | Yield of polyhydric alcohols (as glycerol), percent | Polyhydric alcohols produced | | |
|---|---|---|---|---|---|---|
| | | | | D-arabitol | Erythritol | Glycerol |
| 30% Glucose | 28.6 | 12.24 | 42.4 | ++++ | ++ | ++++ |
| 30% Fructose | 26.4 | 8.22 | 31.1 | +++ | + | +++ |
| 30% Mannose | 19.1 | 6.49 | 33.9 | +++ | + | +++ |
| 30% Galactose | 11.3 | 0.12 | 1.1 | − | − | − |
| 30% Maltose | 0.3 | 0.04 | 13.3 | − | − | − |
| 30% Saccharose | 10.1 | 0.14 | 1.3 | + | − | − |

Effect of aeration

When 500 ml. shaking flask containing 30 to 80 ml. of the culture medium is subjected to shaking culture under the conditions indicated hereinabove, the formation of polyhydric alcohols in good yields is obtained. In this case, $Kd$ value measured by the sodium sulfite titration (cf. J. Agr. Chem. Soc. Japan 27, 704 (1953)) is $2.5 \times 10^{-6}$ g. mol. of $O_2$/atm. min. cc. or higher. However, when the shaking flask containing 120 ml. or more than of the culture medium is cultivated in the same conditions as above, the formation of polyhydric alcohols is inferior to the above case. (In this case $Kd$ value is less than $1.7 \times 10^{-6}$.)

TABLE 7

| Volume of culture medium treated, ml. | Glucose consumed, percent | Polyhydric alcohols produced (as glycerol), percent | Yield of polyhydric alcohols (as glycerol), percent | Polyhydric alcohols produced | | |
|---|---|---|---|---|---|---|
| | | | | D-arabitol | Erythritol | Glycerol |
| 30 | 27.98 | 12.96 | 46.3 | ++++ | ++ | ++++ |
| 50 | 27.98 | 12.07 | 43.1 | ++++ | ++ | ++++ |
| 80 | 27.65 | 11.91 | 43.1 | +++ | ++ | ++++ |
| 120 | 17.49 | 6.18 | 35.3 | +++ | ± | +++ |
| 200 | 11.71 | 2.73 | 23.3 | +++ | − | +++ |

Effect of temperature

The present yeast can be grown between 15°–40° C. in the above medium. Optimum temperature for the production of polyalcohol is 30°–35° C.

Referring to the drawings.

Figure 1:
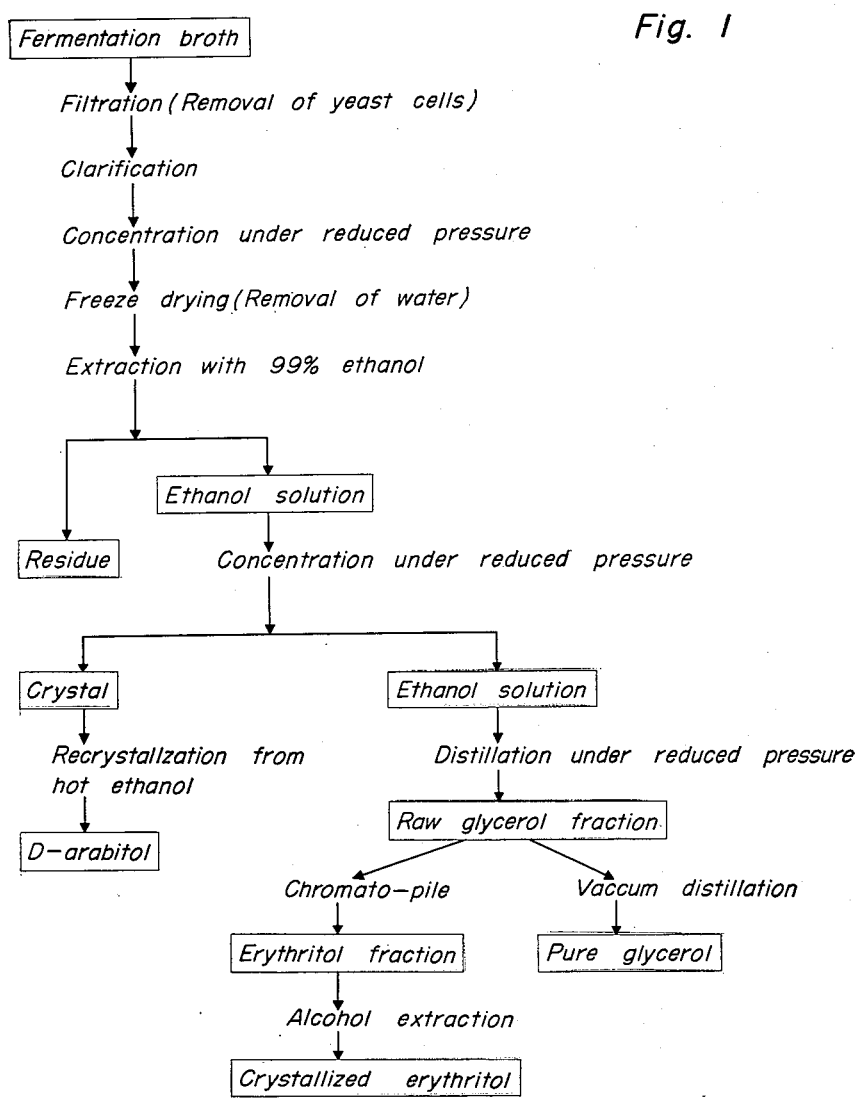
Fig. 1 is a flow sheet of a suitable process for the isolation of D-arabitol, erythritol and glycerol from the fermentation broth which has been fermented according to the present invention.
Figure 2:
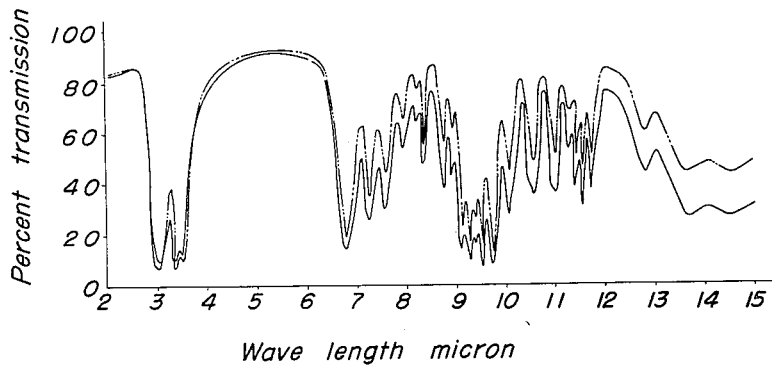
Fig. 2 is a curve of the infra-red spectrum of D-arabitol produced by a method according to the present invention.
Figure 3:
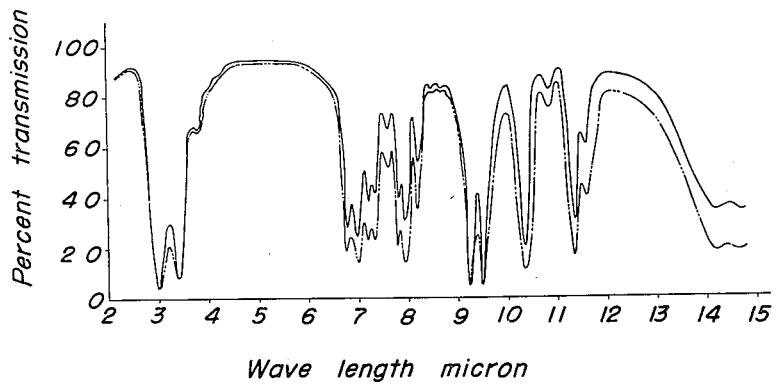
Fig. 3 is a curve of the infra-red spectrum of erythritol produced by a method according to the present invention.

While the present invention has, for convenience, been described in connection with a strain Pichia miso, also other osmophilic, film-forming yeasts may be used for the simultaneous production of polyhydric alcohols. Since many different embodiments of the invention may be made without departing from the spirit and scope thereof, it is to be understood that we do not limit ourselves except as set forth in the following claims.

What I claim is:

1. A method for the production of D-arabitol, erythritol and glycerol, which comprises aerobically culturing a microorganism selected from the group consisting of Pichia miso and Debaryomyces mogii at a temperature of 15° to 40° C. in a medium containing 30 to 45% by weight of fermentable sugars selected from the group consisting of glucose, fructose and mannose, and 0.05 to 0.4% by weight of a nitrogen source selected from the group consisting of an organic nitrogen source and a mixture of an inorganic nitrogen source with a buffer, whereby D-arabitol, erythritol and glycerol are simultaneously produced.

2. A method according to claim 1, wherein the organic nitrogen source is selected from the group consisting of casein hydrolyzate, amino acid, meat extract, corn steep liquor, polypeptone, yeast extract, ammonium lactate and urea.

3. A method according to claim 1, wherein the inorganic nitrogen source is selected from the group consisting of ammonium sulfate and ammonium chloride, and the buffer is potassium citrate-citric acid buffer.

4. A method according to claim 1, wherein the temperature is 30° to 35° C.

5. A method according to claim 1, wherein the culture medium also contains minor amounts of potassium phosphate, magnesium sulfate, calcium chloride, sodium chloride and vitamins.

6. A method according to claim 1, wherein the aerobic culturing is carried out by aeration.

7. A method according to claim 1, wherein the aerobic culturing is carried out by shaking and the K$d$ value is at least $2.5 \times 10^{-6}$ g. mol. of $O_2$/atm. min. cc.

8. A method according to claim 1, wherein the microorganism is *Pichia miso*.

9. A method according to claim 1, wherein the microorganism is *Debaryomyces mogii*.

References Cited in the file of this patent
UNITED STATES PATENTS

| | | |
|---|---|---|
| 2,189,793 | Haehn | Feb. 13, 1940 |
| 2,793,981 | Spencer et al. | May 28, 1957 |